United States Patent
Heidtmann et al.

(10) Patent No.: US 10,752,362 B2
(45) Date of Patent: Aug. 25, 2020

(54) RECEIVING SYSTEMS FOR RECEIVING PERSONS AND OBJECTS FOR A CABIN OF A VEHICLE AS WELL AS AN AIRCRAFT EQUIPPED THEREWITH

(71) Applicant: Airbus Operations GmbH, Hamburg (DE)

(72) Inventors: Andreas Heidtmann, Hamburg (DE); Roland Lange, Hamburg (DE)

(73) Assignee: Airbus Operations GmbH (DE)

( * ) Notice: Subject to any disclaimer, the term of this patent is extended or adjusted under 35 U.S.C. 154(b) by 618 days.

(21) Appl. No.: 15/479,415

(22) Filed: Apr. 5, 2017

(65) Prior Publication Data
US 2017/0283066 A1    Oct. 5, 2017

(30) Foreign Application Priority Data
Apr. 5, 2016  (DE) .......................... 10 2016 106 204

(51) Int. Cl.
    *B64D 11/06*    (2006.01)
(52) U.S. Cl.
    CPC ...... *B64D 11/0636* (2014.12); *B64D 11/0602* (2014.12); *B64D 11/0648* (2014.12)
(58) Field of Classification Search
    CPC .................... B64D 11/0636; B64D 11/0627
    See application file for complete search history.

(56) References Cited

U.S. PATENT DOCUMENTS

| 5,562,331 A | 10/1996 | Spykerman et al. |
| 6,347,590 B1 | 2/2002 | D'Annunzio et al. |
| 7,252,569 B2 * | 8/2007 | Everhart ................ B64D 11/06 206/769 |
| 7,517,014 B2 * | 4/2009 | Schroeder .............. B64D 11/06 244/118.1 |
| 7,530,631 B2 | 5/2009 | Skelly et al. |
| 7,841,560 B2 * | 11/2010 | Schumacher .......... B64D 11/06 244/118.5 |
| 9,688,408 B2 * | 6/2017 | Klettke .................... B60N 2/90 |
| 2003/0071507 A1 | 4/2003 | Sankrithi |
| 2003/0222174 A1 | 12/2003 | Saint-Jalmes |
| 2006/0163917 A1 * | 7/2006 | Schroeder .............. B64D 11/06 297/188.1 |
| 2007/0015422 A1 * | 1/2007 | Everhart ................ B64D 11/06 441/80 |

(Continued)

FOREIGN PATENT DOCUMENTS

DE         100 44 529 A1    3/2002
DE    10 2005 010 434 A1    9/2006

(Continued)

*Primary Examiner* — Philip J Bonzell
(74) *Attorney, Agent, or Firm* — Lerner, David, Littenberg, Krumholz & Mentlik, LLP

(57) ABSTRACT

A receiving system for receiving of persons and objects for a cabin of a vehicle is proposed, the system comprising a seat frame having a plurality of receiving sections created on the seat frame for receiving of a seat unit each; a plurality of seat units, which are mountable on a receiving section each; and at least one stowage bin unit, which is mountable on one of the receiving sections. The stowage bin unit is dimensioned such that it is mountable on an outer one of the receiving sections in case on the remaining receiving sections a seat unit each is mounted.

15 Claims, 3 Drawing Sheets

(56) References Cited

U.S. PATENT DOCUMENTS

2008/0099608 A1\* 5/2008 Schumacher .......... B64D 11/06
                                                244/118.6
2012/0048998 A1    3/2012 Schliwa et al.
2016/0009398 A1\* 1/2016 Klettke ................... B60N 2/90
                                                297/183.6

FOREIGN PATENT DOCUMENTS

EP    1 366 988 A1    12/2003
EP    2 423 107 A2    2/2012
EP    2 965 990 A1    1/2016

\* cited by examiner

RECEIVING SYSTEMS FOR RECEIVING PERSONS AND OBJECTS FOR A CABIN OF A VEHICLE AS WELL AS AN AIRCRAFT EQUIPPED THEREWITH

FIELD OF THE INVENTION

The invention relates to a receiving system for receiving persons and objects for a cabin of a vehicle as well as an aircraft having a fuselage, a cabin created therein, at least one fuselage opening closable through an aircraft door and at least one arrangement created in the cabin through such a receiving system.

BACKGROUND OF THE INVENTION

The equipment of passenger cabins in transportation means and particularly in aircraft is often subjected to the desire of maximizing the available number of passenger seats without reducing the passenger comfort, under fulfillment of all safety relevant regulations at the same time and under use of common comfort-relevant installations. This includes inter alia individual and common utilities, lavatories, galleys and similar. A ratio of the number of passenger seats to remaining installations in passenger cabins is a factor, which co-determines the profitability in line operation. A maximizing of passenger seats may inter alia be realized using intelligent construction and arrangement solutions.

By reconfiguration of a door region between two opposed aircraft doors, and installations bordering thereto, it may possibly be feasible to integrate an additional row of seats into the cabin of an aircraft that directly borders the door region. However, due to the extension of installations of the aircraft door into the door region as well as due to the tapering of an aircraft fuselage in the region of forward aircraft doors a larger distance of an outer seat to a cabin wall bordering the aircraft door is required, since otherwise a sufficient legroom for a passenger would not be realizable.

The integration of additional passenger sear furthermore increases the expectable amount of hand luggage in the cabin, which necessitates installation or release of additional over-head-stowage bins for this purpose.

EP 2 423 107 A2 shows an arrangement for receiving passengers in a transportation means having three placement spaces arranged adjacent to each other, which are arranged in a door near region of the passenger cabin, in which commonly a galley is installed.

BRIEF SUMMARY OF THE INVENTION

An aspect of the invention is to facilitate an arrangement of passenger seats in a cabin, which allows a distinct compactness and seating density, and at the same time increases the capacities for hand luggage and similar, without requiring larger modifications in the layout of the cabin.

A receiving system for receiving of persons and objects for a cabin of a vehicle is proposed, the system comprising a seat frame having a plurality of receiving sections created on the seat frame for receiving of a seat unit each; a plurality of seat units, which are mountable on a receiving section each; and at least one stowage bin unit, which is mountable on one of the receiving sections. The stowage bin unit is dimensioned such that it is mountable on an outer one of the receiving sections in case on the remaining receiving sections a seat unit each is mounted.

Consequently, the receiving system consists of multiple components and is used for creating one or more arrangements of seat units and a stowage bin unit with a common seat frame each. In the context of the invention a seat frame is a highly loadable mechanical frame construction, which is mountable onto a cabin floor and which primarily serves for providing a base for passenger seats and is able to receive seat surfaces as well as back rests that are swivably supportable on the seat frame. In commercial aircraft seat frames have established that are able to receive two, three or four seat surfaces and that are mountable to standardized seat rails, which are often integrated into a cabin floor. Exemplarily a seat frame comprises two groups of a front seat leg, a rear seat leg and a diagonal strut extending therebetween, wherein each group of these components spans a plane that extends vertically to a cabin floor. Both groups are distanced to each other and together carry a front and a rear support tube, which are arranged at a distance to a cabin floor and serve for receiving seat units. For delimiting the individual receiving section seat dividers may be used, which are exemplarily adapted for mounting an arm rest.

Consequently, the receiving sections are exemplarily realized by means of a front and rear support tube, at which fastening means are attachable, which particularly include force and/or form fitting fastening means. Of course, other kinds of seat frames with different receiving sections are conceivable.

By dimensioning the stowage bin unit for adaption to the seat units the seat frame, which is usually intended for a plurality of seat units, the seat frame may variably be equipped with a stowage bin unit instead of a seat unit. Particularly with compact cabin arrangements having an additional passenger seat row integrated close to or in the door region it may be advisable to only arrange two seat units or passenger seats, respectively, on one seat frame. An outer seat unit, which directly borders at a cabin wall or exemplarily at an aircraft door, respectively, would lead to a reduced comfort of the passenger present there, as in the case of forward aircraft doors and a tapering aircraft fuselage an emergency slide receptacle that is integrated into the door clearly reduces the available leg room. Instead of a complete reconception of a seat frame a common seat frame may be used in order to provide a stowage bin instead of an outer passenger seat. Hence, the modification is marginal overall; however, particularly with the integration of an additional seat row into the cabin additional stowage space may be generated, which allows the stowage of hand luggage for the passengers present there. Consequently, a modification of overhead-stowage bins may be avoided. Of course, the use of the system may also be conceivable for purposes that do not include an arrangement at the aircraft door or at a door region. The stowage bin unit in the cabin does not necessarily have to be positioned at a lateral outer receiving section, but may also be realized at a place that faces more to the inner side of the cabin.

If a seat frame is used that comprises a front support tube and a rear support tube it would also be possible to shorten the support tubes in comparison to common seat frames, such that the seat frame comprises a slightly reduced width and such that a stowage bin unit may be used, which is slightly narrower than a seat unit.

In a particularly preferred embodiment the stowage bin unit comprises a fastening section, which is mountable to a receiving section, which is designed for receiving a seat unit, of the seat frame. In particular the stowage bin unit may comprise force fitting, bracket-like fastening means, which are clampable to the support tubes. Depending on the construction of the seat frame any modifications to the seat frames may be prevented to use the advantages of the system according to an embodiment of the invention.

In a particularly preferred embodiment the seat frame comprises three receiving sections. Hence, hereby a seat frame is used, which is used in most commercial aircraft.

The stowage bin unit may provide a closed storage space, which is accessible from outside through at least one stowage bin flap that closes an access opening. Resultantly, by this a full-fledged stowage bin for use during the whole flight may be provided, which is permanently, i.e. also during take-off and landing, is loadable with luggage. Of course, the capacity depends from the size of the stowage bin, while the receivable weight may clearly exceed the weight of a common stowage bin, since the seat frame is designed for carrying the weight of a passenger. Depending on the arrangement and based on certification rules the stowage bin flap should be able to absorb respective loads of slipping baggage items.

Exemplarily, the stowage bin flap may be created at a front of the stowage bin unit, such that a passenger may load the stowage bin relatively comfortably from inside a door region, in particular in case an additional seat row is arranged in the door region. Hence, if the stowage bin is used by multiple passengers a minimum disturbance is ensured.

The stowage bin unit may comprise a first side wall, a second side wall and a back wall, which define a stowage space provided inside the stowage bin unit. The first side wall may be substantially planar and the second side wall may comprise a curvature, through which a width of the stowage space created between the first side wall and the second side wall decreases with increasing distance from the back wall. It is conceivable that the stowage bin unit borders at neighboring seat units with its planar first side wall, such that the width of the group of seat units and the stowage bin unit decreases in the seating direction. By this, an integration of such a stowage bin unit is particularly suitable for an arrangement in the near of an aircraft door having a receptacle arranged thereon for receiving an emergency slide.

Additionally, a bulged second side wall would also facilitate the integration at a curved cabin wall.

The stowage bin unit may also be designed for being plugged and arrested on support tubes of the seat frame, such that the stowage bin unit may also slightly extend underneath the respective receiving section.

The back wall of the stowage bin unit may comprise a curved shape or a shape having at least one kink, which shape substantially corresponds to the shape of a back rest of a seat unit. Hence, the space created for passengers present behind the stowage bin unit corresponds to the space behind a common passenger seat and consequently, the comfort of other passengers is not confined through the integration of the stowage bin unit.

The maximum width of a stowage bin unit may preferably correspond to at least a half width of a seat unit. Also, the conception of a stowage bin unit having a maximum width, which corresponds to the width of a seating unit, is conceivable.

The stowage bin unit may comprise an extension in depth, which substantially corresponds to the distance between a seat front edge and a seat rear edge of a seat unit. Besides the possible connection to a common seat frame, no limitations for the neighboring installation space occur from a stowage bin unit mounted onto a seat frame.

The stowage bin unit may furthermore be designed in such a manner that in an installed state of the stowage bin unit its upper delimitation corresponds to the upper delimitation of a neighboring seat unit, such that a delimitation of the stowage bin unit comparable to a cabin wall is present and such that the head of a passenger does not hit a delimiting edge of the stowage bin unit during lateral accelerations of the aircraft.

Preferably, the stowage bin unit is dimensioned for receiving one of more pieces of baggage of the passengers or the flight attendants or other aircraft relevant pieces of equipment.

The invention further relates to an aircraft having a fuselage, a cabin created therein, at least one fuselage opening closable through an aircraft door and at least one arrangement created in the cabin by the receiving system according to the above description, the arrangement having two seat units and one stowage bin unit on three adjacent receiving sections of a seat frame directly next to the fuselage opening.

The aircraft door may further comprise a receptacle for receiving an emergency slide. Preferably, the stowage bin unit is dimensioned in such a manner, that in case of an arrangement of the seat frame directly at a door region a second side wall of the stowage bin unit that faces to the fuselage opening comprises a predetermined minimum distance to the receptacle.

With positioning a stowage bin unit at a lateral outer receiving section it is further conceivable that a directly connecting cabin wall comprises a cutout, which corresponds to the contours of the stowage bin unit, into which cutout the stowage bin unit extends. By this, the size of the stowage space may be increased and the weight of the stowage bin unit may be limited at the same time.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

Figure 1:
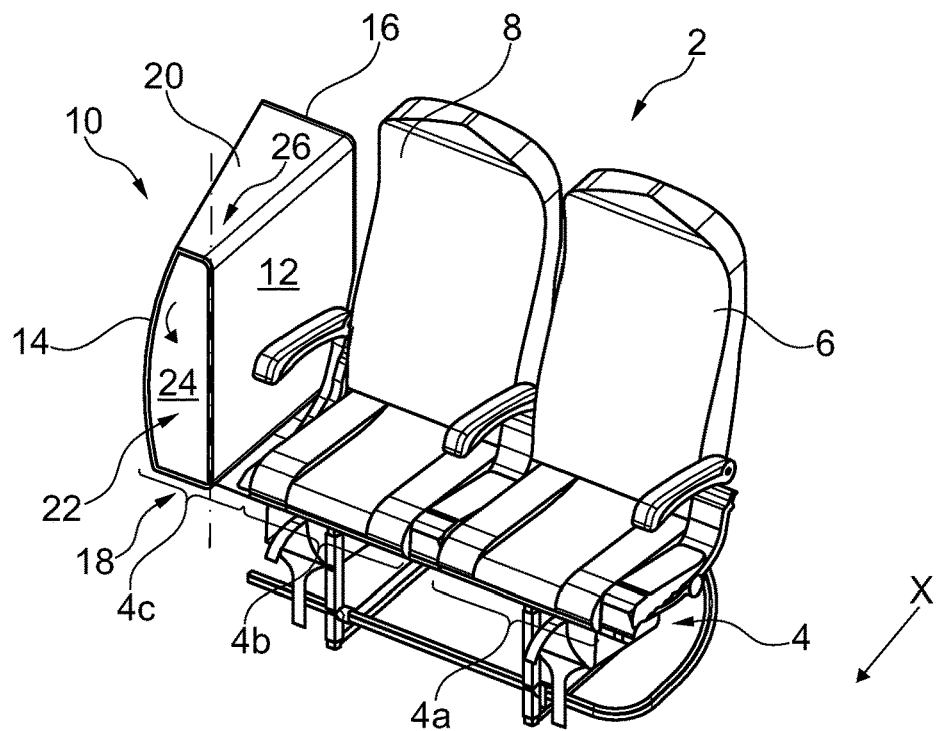
FIGS. 1 and 2 show an arrangement of seats and a stowage bin on a seat frame, the arrangement being created by a system according to the invention, in two different, perspective illustrations.

FIG. 1 shows an arrangement 2 having a seat frame 4, a first seat unit 6, a second seat unit 8 and a stowage bin 10, which are mounted on the seat frame 4. The individual components, which create the arrangement 2 in FIG. 1, relate to a receiving system, with which different arrangements may be created from seat frames, seat units and stowage bin units.

In the illustration of FIG. 1 the seat frame 4 is equal to a common seat frame for the integration of three passenger seats, which may be created through the seat units 6 and 8.

For their attachment the seat frame 4 comprises receiving sections 4a, 4b and 4c. However, in FIG. 1 exemplarily a stowage bin unit 10 instead of a third seat unit is arranged on the receiving section 4c, which stowage bin unit 10 comprises a first substantially planar side wall 12, a second side wall 14, a back wall 16, a bottom 18 and an upper wall 20. It is recognizable that the distance between the first side wall 12 and the second side wall 14 decreases along the seating direction x at a constant height from the back wall 16 to an access opening 22. Hence, the stowage bin unit 10 tapers along the seating direction x, the access opening 22 may be closable through a flap 24, such that baggage items inserted into stowage bin unit 10 can be secured from falling out.

Due to the tapered shape of the stowage bin unit 10 the arrangement 2 may be positioned near a tapered fuselage region and/or an aircraft door having an escape slide receptacle, which aircraft door has a sufficient distance to the second side wall 14 when the aircraft door is closed. Altogether, instead of integrating just two passenger seats near a door region, additionally a stowage bin unit 10 may be provided, such that the use of the installation space at the door region is optimized.

Figure 2:
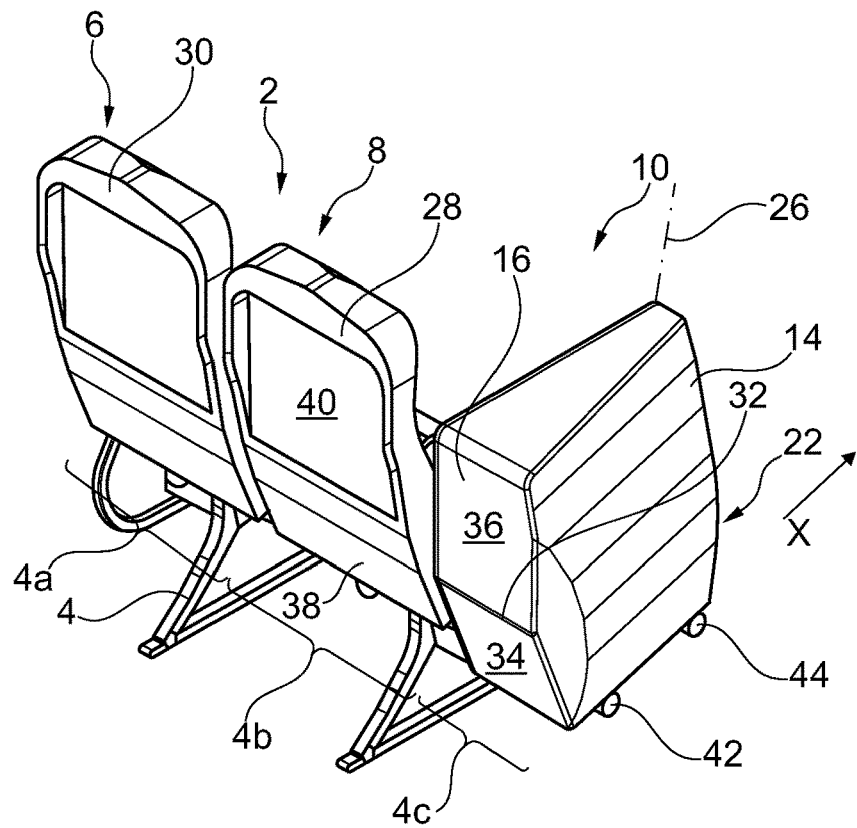

In FIG. 2 the arrangement 2 is shown from a rearward perspective. Here it is particularly evident that the back wall 16 is adapted to the shape of a back rest 28 or 30, respectively, on the seat units 6 and 8. For this purpose the back wall 16 comprises a kink 32, which divides the back wall 16 substantially into a bottom section and a top section 36. The bottom section 34 runs parallel to and substantially in the same plane of or in an elongation of a lower section 38 of the back rest 28 in a swiveled-up state. However, the top section 36 runs substantially parallel to an upper section 40 of the back rest 28.

Furthermore, a rear support tube 42 and a front support tube 44 are recognizable in this illustration, which are usually used for fastening a passenger seat and provide the receiving sections 4a, 4b and 4c in doing so. Also, the stowage bin unit 10 is adapted for being fastened at a receiving section 4a, 4b or 4c, e.g. through a corresponding fastening section (not shown), such that a modification of the seat frame 4 is not required.

For adaption of the width of the seat frame it is conceivable to shorten the support tubes 42 and 44 slightly, such that the stowage bin unit 10 comprises a width, which is below the width of a seat unit 6 or 8, respectively. The width may exemplarily correspond to the half width of a seat unit 6 or 8, respectively. Hence, the arrangement 2 is narrower as a group of three common passenger seats altogether.

The stowage bin unit 10 comprises a certain, laterally facing bulge, which is particularly suitable for the adaption to a curved fuselage wall. Also, the height extension of the stowage bin unit 10 is limited to the height of the support tubes 42 and 44, such that the stowage bin unit 10 extends from the support tubes 42 and 44 only upwardly. Resultantly, underneath the stowage bin unit 10 a generously dimensioned leg room for passengers present behind is provided.

Figure 3:
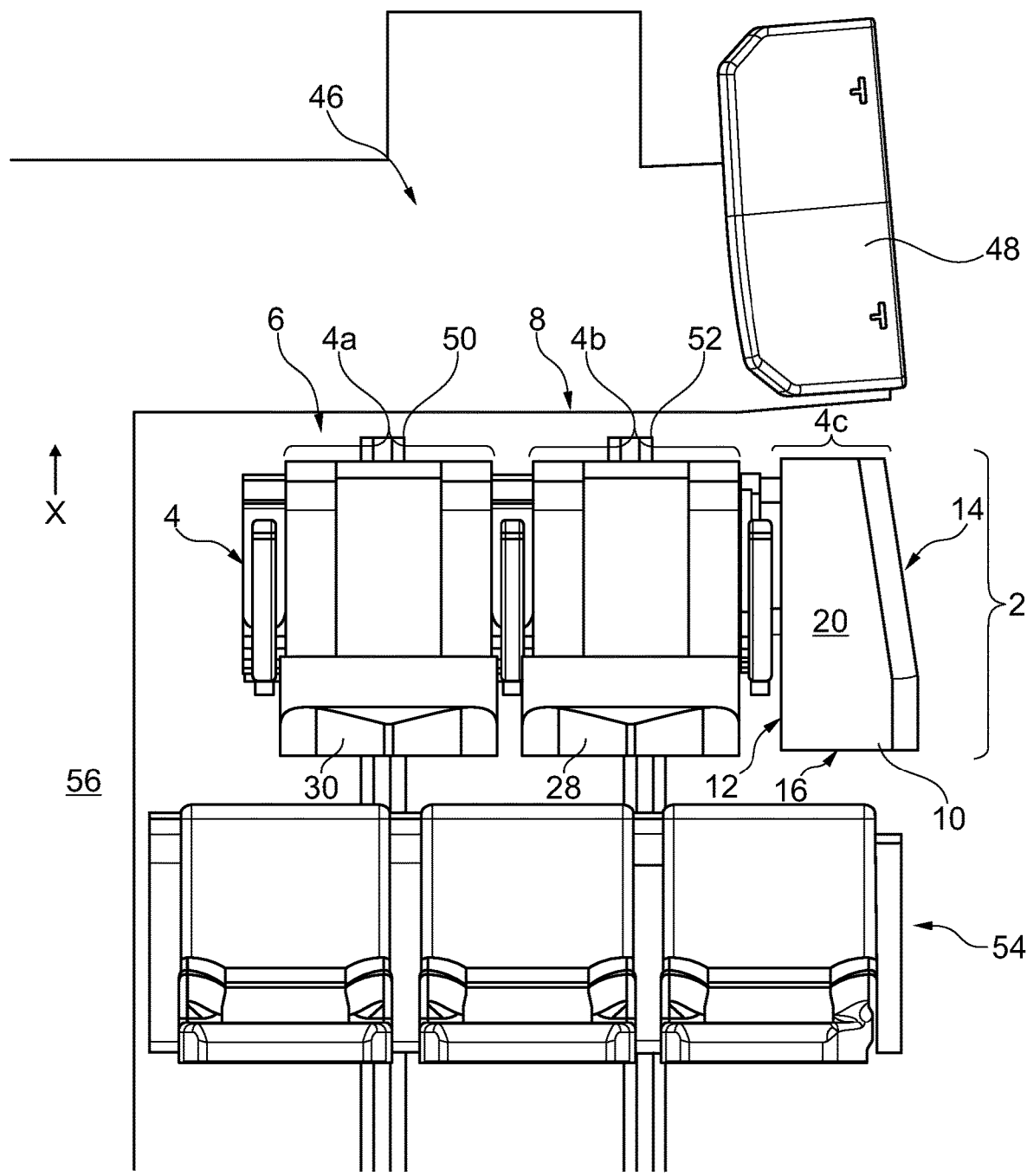
FIG. 3 shows a top view onto a door region in an aircraft cabin having an arrangement of FIGS. 1 and 2.

FIG. 3 shows a door region 46, which borders at an aircraft door, which is indicated by means of a receptacle 48 arranged thereon for receiving of an emergency slide. The arrangement 2 directly borders at the door region 46, which arrangement 2 is mounted to seat rails 50 and 52. The stowage bin unit is arranged on a lateral outer end of the seat frame 4, wherein the curved second side wall 14 faces outwardly.

Exemplarily the support tubes 42 and 44, which are not visible in FIG. 3, are shortened in a way that the arrangement 2 comprises a slightly smaller width than a seat row 54 directly behind. In doing so, a seat unit 6 arranged near an aisle 56 may be placed laterally further outward, which slightly facilitates the access through the door region 46 into the aisle and also provides sufficient leg room for passengers on both seat units 6 and 8.

Figure 4:
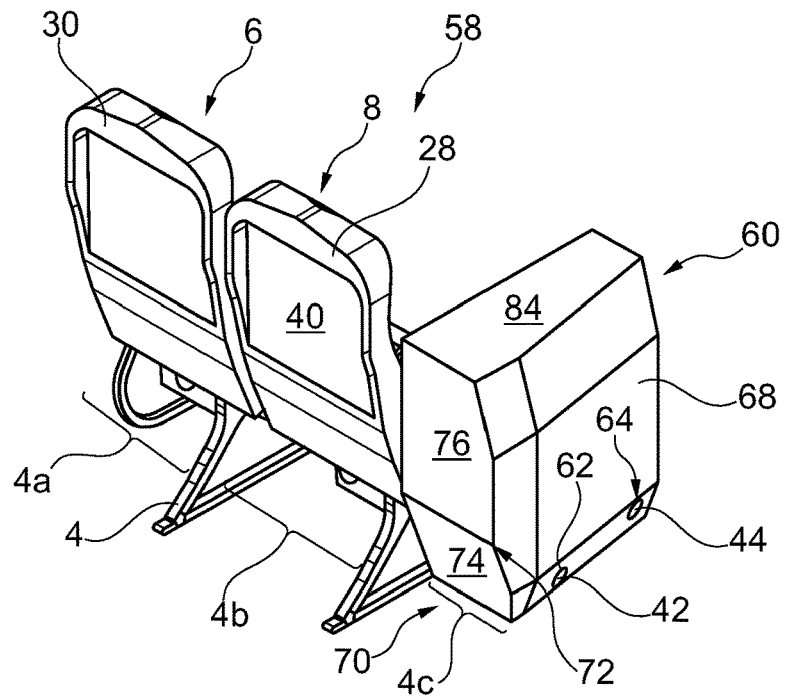
FIGS. 4 and 5 show an alternative illustration of an arrangement of FIGS. 1 and 2.
Figure 5:
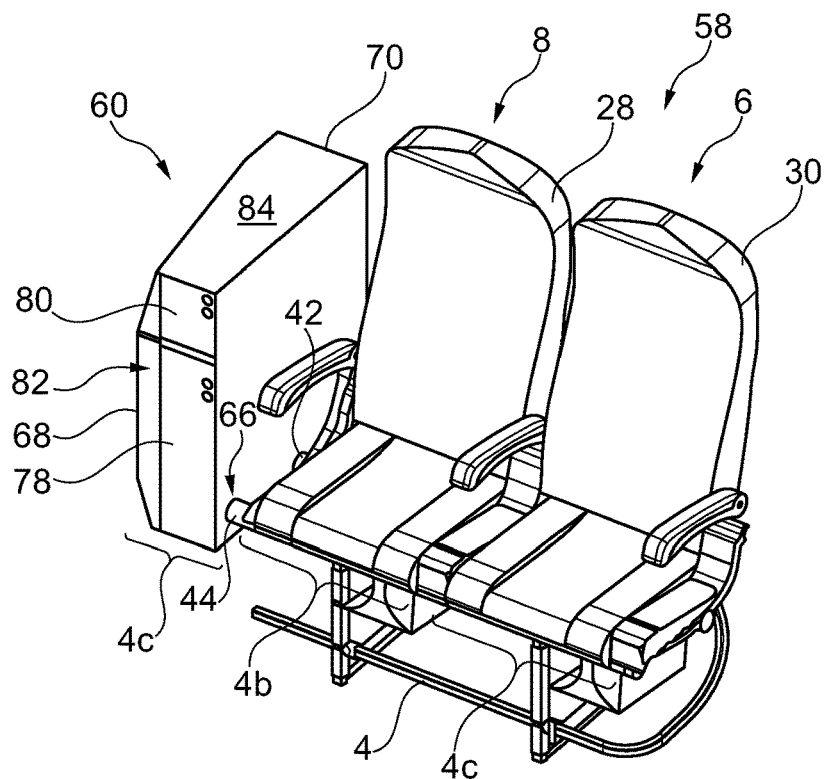

In FIGS. 4 and 5 an arrangement 58 is shown, which substantially corresponds to the arrangement 2 of the FIGS. 1 and 2, but comprises a modified stowage bin unit 60. The modification lies in leading the support tubes 42 and 44 through the openings 62 and 64, which extend through a first side wall 66 and a second side wall 68 and are exemplarily arrested to the stowage bin unit 60 in its interior. Hence, the stowage bin unit 60 may extend over the support tubes 42 and 44 into the direction of a cabin floor and thus increase the available volume of the stowage space created therein. The leg room created under the stowage bin unit 60 remains sufficient for passengers present behind.

The shape and the remaining dimensions exemplarily correspond those of the stowage bin unit 10. A back wall 70 is also adapted to the shape of the back rest 28 of the adjacent seat unit 8 and comprises a kink 72, which divides the back wall 70 into a bottom section 74 and a top section 76. An access opening 82, which is exemplarily closable through a plurality of stowage bin flaps 78 and 80, is also present in a front region, i.e. facing in the x direction. Finally, an upper wall 84 complements the stowage bin unit 60.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A receiving system for receiving of persons and objects for a cabin of a vehicle, the system comprising a seat frame having a seating direction and having
   a plurality of receiving sections created on the seat frame for receiving of a seat unit each and extending in a direction perpendicular to the seating direction, wherein the plurality of receiving sections are created by at least one support tube;
   a plurality of seat units, each of the plurality of seat units configured to be mounted on one of the plurality of receiving sections adjacent to one another along the direction perpendicular to the seating direction; and at least one stowage bin unit configured to be mounted on one of the plurality of receiving sections and adjacent to one of the plurality of seat units along the direction perpendicular to the seating direction, wherein the at least one stowage bin unit is dimensioned so as to be mountable on an outer one of the plurality of receiving sections when one of the plurality of seat units is mounted on each remaining one of the plurality of receiving sections, wherein the at least one stowage bin unit comprises a first side wall, a second side wall, a bottom, a front, and a back wall, which define a stowage space provided in the at least one stowage bin unit, and wherein,
the bottom of the at least one stowage bin rests on the at least one support tube, or
at least one of the first side wall and second side wall comprises an opening, and the at least one stowage bin is mounted on the at least one support tube such that the at least one support tube is led through the opening.

2. The receiving system of claim 1, wherein the at least one stowage bin unit comprises a fastening section mountable to a receiving section of the plurality of receiving sections configured for receiving a seat unit of the plurality of seat units, of the seat frame.

3. The receiving system of claim 1, wherein the plurality of receiving sections of the seat frame comprises three receiving sections.

4. The receiving system of claim 1, wherein the at least one stowage bin unit provides a closed storage space accessible from outside through at least one stowage bin flap that closes an access opening.

5. The receiving system of claim 4, wherein the at least one stowage bin flap is created at the front of the at least one stowage bin unit.

6. The receiving system of claim 1, wherein the first side wall is substantially planar and the second side wall comprises a curvature, through which a width of the stowage space created between the first side wall and the second side wall decreases with increasing distance from the back wall.

7. The receiving system of claim 1, wherein the at least one stowage bin comprises a back wall, wherein the back wall comprises a curved shape or a shape having at least one kink, which shape substantially corresponds to the shape of a back rest of an adjacent seat unit of the plurality of seat units.

8. The receiving system of claim 1, wherein the at least one stowage bin unit comprises an extension in depth, substantially corresponding to the distance between a seat front edge and a seat rear edge of an adjacent seat unit of the plurality of seat units.

9. The receiving system of claim 1, wherein the at least one stowage bin unit is dimensioned for receiving a baggage piece.

10. The receiving system of claim 1, wherein the maximum width of the at least one stowage bin unit corresponds to at least half the width of a seat unit of the plurality of seat units.

11. The receiving system of claim 1, wherein the at least one stowage bin unit is dimensioned in such a manner that in an installed state of the at least one stowage bin unit an upper delimitation thereof corresponds to the upper delimitation of a neighboring seat unit of the plurality of seat units.

12. An aircraft having a fuselage, a cabin created therein, at least one fuselage opening closable through an aircraft door and at least one arrangement created in the cabin by a receiving system for receiving of persons and objects for a cabin of a vehicle, the system comprising a seat frame having a seating direction and having first, second, and third receiving sections created on the seat frame for receiving of a seat unit each and extending in a direction perpendicular to the seating direction, wherein the first, second, and third receiving sections are created by at least one support tube;

first and second seat units, each of the first and second seat units configured to be mounted on a first receiving section and a second receiving section, respectively; and a stowage bin unit configured to be mounted on the third receiving section, wherein the at least one stowage bin unit is dimensioned so as to be mountable on an outer one of the first, second, and third receiving sections when the first and second seat units are mounted on first and second receiving sections, wherein the seat frame is arranged directly next to the fuselage opening, wherein the at least one stowage bin unit comprises a first side wall, a second side wall, a bottom, a front, and a back wall, which define a stowage space provided in the at least one stowage bin unit, and wherein,
the bottom of the at least one stowage bin rests on the at least one support tube, or
at least one of the first side wall and a second wall comprises an opening, and the at least one stowage bin is mounted on the at least one support tube such that the at least one support tube is led through the opening.

13. The aircraft of claim 12, wherein the stowage bin unit is arranged on the third receiving section that faces to the fuselage opening.

14. The aircraft of claim 12, wherein the stowage bin unit comprises an access opening, which faces to a door region, wherein a second side wall of the stowage bin unit that faces away from the first and second seat units is curved at least around an axis perpendicular to the cabin floor into a direction facing away from the fuselage opening.

15. The aircraft of claim 12, wherein the aircraft door carries a receptacle for receiving an emergency slide and wherein the stowage bin unit is dimensioned in such a manner, that in case of an arrangement of the seat frame directly at a door region a second side wall of the stowage bin unit that faces to the fuselage opening comprises a predetermined distance to the receptacle.

* * * * *